Figure 1:
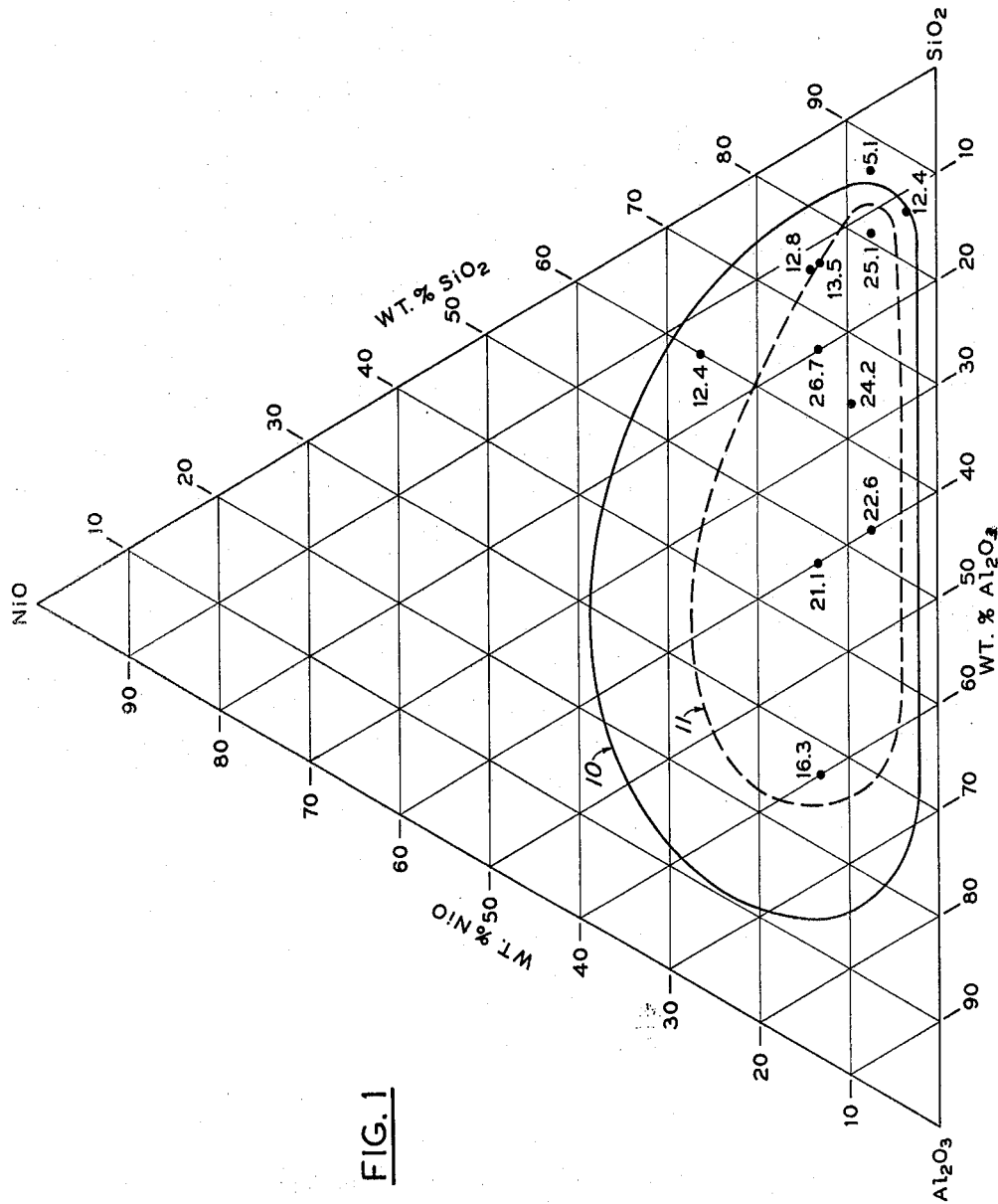

INVENTOR
BERNARD F. MULASKEY

United States Patent Office 3,243,368
Patented Mar. 29, 1966

3,243,368
HYDROCRACKING PROCESS EMPLOYING A CATALYST CONTAINING A GROUP VIII METAL COMPONENT
Bernard F. Mulaskey, Pinole, Calif., assignor to Chevron Research Company, a corporation of Delaware
Filed May 27, 1965, Ser. No. 461,603
28 Claims. (Cl. 208—111)

This application is a continuation-in-part of my previous application Serial No. 243,283, filed December 10, 1962, and Serial No. 420,427, filed December 22, 1964, both now abandoned, the latter application being in turn a continuation-in-part of my now abanoned application Serial No. 243,603, filed December 10, 1962.

This invention relates to a hydrocracking process, and, more particularly, to an improved hydrocracking process utilizing hydrocracking catalysts characterized by high hydrocracking activities and high resistance to catalyst deactivation.

As is well known to those skilled in the petroleum refining art, hydrocracking is a reaction wherein mixtures of hydrocarbons are converted to lower boiling products in the presence of added hydrogen and a catalyst at elevated temperatures and pressures. One of the major lines of development that has occurred in the hydrocracking art has been the employment of catalysts comprising acidic supports, e.g., silica-alumina composites, having at least one hydrogenating-dehydrogenating component disposed thereon. In the earlier stages of development, temperatures on the order of 850° to 1000° F. and pressures in excess of 3000 p.s.i.g. were characteristic of the process. More recently, it has been found that naturally occurring petroleum constituents, such as nitrogen containing compounds, may adversely affect the catalyst. If these undesirable compounds are removed from the feed to the hydrocracking zone, as by hydrofining, lower operating temperatures and pressures and longer catalyst on-stream life are realized if the proper catalyst is employed. This result is, of course, desirable since it allows a considerable reduction in high temperature and pressure equipment, and the desired liquid products are at a maximum due to the reduction in coke and light gas production at the lower temperatures and pressures.

Examples of these more recent hydrocracking developments have been disclosed in the patent literature. One such development has been the use of catalysts employing metals of the platinum and palladium series (herein defined as the metals in the Periodic Chart having atomic numbers of 44 to 46, inclusive, and 76 to 78, inclusive) disposed, as by impregnation, on acidic, silica-containing supports, e.g., silica-alumina composites having cracking activities. Representative of such patent disclosures is United States Patent 2,945,806 (Ciapetta). This patent describes a process for hydrocracking relatively high boiling hydrocarbon fractions, in the presence of added hydrogen, by contact, at a temperature of from about 400° to 825° F., a hydrogen pressure of from about 100 to 2500 p.s.i.g. and a liquid hourly space velocity (LHSV) of from about 0.1 to 10, with a catalyst that includes between 0.05% and 20%, by weight, of platinum or palladium series metal deposited upon a synthetic composite (of defined cracking activity) containing silica and at least one other oxide, e.g., alumina, zirconia, thoria. In this patent, the patentee has disclosed that there appears to be nothing critical about the manner in which the catalyst is made. Thus, it is stated that the silica-containing carrier or support can be made by the usual methods well known in the catalyst art, accompanied by brief disclosures of such methods. As to the disposition of the metal or metals upon the carriers, this too is described generally but, in all cases involves the disposition, as by impregnation, upon calcined, finished cracking catalyst carriers.

Another hydrocracking development, and one that has had pronounced commercial success, is the process described in U.S. Patent No. 2,944,066 (Scott), issued July 5, 1960. Briefly, this patent covers a hydrocracking process wherein hydrocarbon distillates, having a total nitrogen content of less than 10 p.p.m. (parts per million), along with at least 1500 s.c.f. (standard cubic feet) of hydrogen per barrel of feed, are contacted with a hydrocracking catalyst. The catalyst comprises from about 0.1 to about 35% by weight (as metal) of the total catalyst of nickel sulfide and/or cobalt sulfide as the hydrogenating-dehydrogenating component dispersed as by impregnation, on an active siliceous catalyst support. The contacting step in the hydrocracking zone is effected at hydrogen partial pressures of at least 350 p.s.i.g. and at temperatures below about 700° F., and the reaction is further characterized by the consumption of at least 500 s.c.f. of hydrogen per barrel of feed converted to products boiling below the initial boiling point of the feed.

It has now been found that hydrocracking processes, including those referred to above, can be improved by the utilization of specific hydrocracking catalysts having high activities and extensive on-stream lives. Broadly, the present invention covers an improved hydrocracking process comprising hydrocracking a hydrocarbon feed to products boiling below the initial boiling point of said feed by contacting said feed, in the presence of hydrogen and under hydrocracking conditions, with a catalyst comprising at least one Group VIII metal-containing hydrogenating - dehydrogenating component incorporated within an acidic solid xerogel comprising silica and at least one other metallic oxide, said catalyst being prepared as follows: adding at least one alkylene oxide, containing from 2 to 3 carbon atoms per molecule, to a mixture comprising a silica sol, at least one Group VIII metal halide, and at least one other metal halide, the metal of said latter halide being the same metal as that present in said acidic solid xerogel, all of said halides being soluble in said silica sol. The resulting mixture is then allowed to set into a hydrocogel, and the hydrocogel is then dehydrated to produce said catalyst.

The hydrocracking process of the present invention can be conducted under any conditions of temperature, pressure, feed composition (including feed boiling ranges from about 300° to over 100° F. as well as those feeds that contain compounds that foul the catalyst) and feed rate so long as the catalyst employed comprises at least one Group VIII metal-containing hydrogenating-dehydrogenating component incorporated within an acidic xerogel comprising silica and at least one other metal oxide. However, it is preferred to contact the process at temperatures below about 850° F., and total pressures from about 100 to about 3000 p.s.i.g.

Even more preferably, the present hydrocracking process is conducted such that hydrocarbon distillates having a total nitrogen content of less than about 10 p.p.m. (parts per million), along with at least 1500 s.c.f. (standard cubic feet) of hydrogen per barrel of feed, are contacted with the hydrocracking catalyst produced in accordance with the present invention. The contacting step in the hydrocracking zone in this preferred operation is effected at hydrogen partial pressures of 100 p.s.i.g. or more and at temperatures below about 700° F.

As noted, the catalyst used in the subject hydrocracking process comprises at least one Group VIII metal-containing hydrogenating-dehydrogenating component incorporated within an acidic solid. This acidic solid component comprises silica and at least one metal oxide other than silica and the Group VIII metal-containing hydrogenating-dehydrogenating component. Thus, in addition to the Group VIII component, the catalyst must contain silica and at least one other metal oxide. The method of manufacturing this catalyst is an essential feature of the present hydrocracking process.

The manufacture of the subject catalyst is done in a series of stages. The first operation involves forming a mixture comprising a silica sol, at least one Group VIII metal halide, said halide being soluble in the silica sol, and at least one other metal halide, the metal of said halide being the same metal as that present in the described acidic solid.

The silica sol can be made by any conventional procedure. A number of methods for producing such a sol are known to those skilled in the art. Thus, silica sols can be made by hydrolyzing tetraethyl orthosilicate with an aqueous HCl solution, either in the presence or absence of solvents, such as alcohol containing from 1 to 4 carbon atoms per molecule, acetone, methyl ethyl ketone, and the like. Likewise, silica sols can be prepared by contacting silicon tetrachloride with a cold methanol and water solution, or with 95% ethyl alcohol, or with ice, or such solvents as aqueous acetone and aqueous methyl ethyl ketone. Also, silica sols can be made by contacting sodium silicate with an ion exchange resin to remove the sodium, or by contact with an acid and thereafter removing sodium by ion exchange. Preferably, alkali metals and alkaline earth metals are avoided in manufacturing the silica sol because such metals have often been found to adversely affect the activity of the finished hydrocracking catalysts. The particular method of making the silica sol will be related to the specific metal halide or halides admixed with the silica sol due to the necessity of the metal halide or halides to be soluble in the silica sol.

The metal halides that can be mixed with the silica include those metals that form oxides and which can and have been used, in conjunction with silica, to product cracking catalysts. Among these are the halides and oxyhalides of aluminum, zirconium, magnesium, titanium and thorium. The requirement that the metal halide be soluble in the silica sol imposes some restrictions upon the particular halides employed. Thus, metal fluorides are not soluble in the silica sol and cannot be employed unless at least one soluble metal halide is also present. The inclusion of a fluoride is entirely feasible but would be for another purpose entirely, namely to impart additional acidity to the final catalyst, and not as a necessary component of the silica sol-metal halide mixture. As opposed to the fluorides, the chlorides, bromides and iodides of particular metals all can be soluble in the silica sol if the proper solvent (such as methanol) is employed. Of all the possible metal halides, it is preferred to use aluminum, zirconium, and/or magnesium halide, and, of these, the chlorides.

To complete the initial mixture, at least one Group VIII metal halide (which includes such materials containing both metal and halide as chloroplatinic acid) is added, said halide also being soluble in the silica sol-metal halide mixture. Again, insoluble metal fluorides cannot be employed alone. However, they can be employed in conjunction with other Group VIII metal halides that are soluble in the silica sol. Soluble chlorides, bromides and iodides are all suitable, with the chlorides preferred.

The actual order of mixing the components in the above mixture is not critical. The silica sol can be first formed with subsequent addition of the Group VIII metal halides plus the other metal halides. Or, the silica sol can be formed as the last step by adding the silicon compound to a mixture containing all of the other components. However, this complete mixture should be formed before the addition of the alkylene oxide described below.

The concentrations of the various components of the final catalyst, and thus the concentrations of the silica sol and metal halides in the mixture, can vary over relatively large ranges. The concentration of the components in the mixture (having a minimum of three components) are adjusted such that the catalyst produced therefrom will have a silica content of from about 3 to 97 weight percent, a Group VIII metal content of from about 0.02 to 35 weight percent, and a total weight percent of the other metal oxide and/or oxides of from just under 3 to just under 97%. Preferred ranges of the Group VIII metal component vary over fairly large ranges, dependent to a large extent upon the particular Group VIII metal and/or metals employed. Thus, catalysts having noble metal components, i.e., members of the platinum-palladium series, will have a preferred metal content of from about 0.05 to 5 weight percent (of the entire catalyst) whereas catalysts containing nickel and/or cobalt components will have a higher preferred metal content as described subsequently.

After forming the silica sol-Group VIII metal halide-other metal halide mixture, at least one alkylene oxide containing from 2 to 3 carbon atoms per molecule is added to it. The amount of ethylene oxide and/or propylene oxide added can be expressed in the mol ratio of alkylene oxide to total halide ions. This ratio should be from about 0.5 to 7.0 or more, and preferably, from about 1.0 to 5.0.

Following the addition of the alkylene oxide, the resulting mixture will set (gel) into a hydrocogel after a period of from a few seconds to several hours, depending upon the concentration of the components and the temperature. This hydrocogel can be dried by conventional methods, such as by evaporation of the solvents at room temperature or above. This dried xerogel will still contain about 30 weight percent water. This is then further dehydrated to drive off substantially all of the remaining water. This dehydration can be accomplished, for example, by heating to about 1000° F. under atmospheric pressure, or by heating to about 850° F. under a partial vacuum. Other dehydrating methods are known to those familiar with catalyst manufacturing techniques.

Following dehydration, it is preferred that the xerogel be thermactivated by heating the composite, under dry conditions, to a temperature in the range of from about 1200° to 1800° F. for a period of from about 0.25 to 48 hours. This thermactivation step has been found to enhance the activity of the final catalyst.

During the dehydration operation (and thermactivation operation, if employed), substantially all of the components within the xerogel will be converted to their corresponding oxides. However, with some of the palladium and/or platinum series metal oxides, decomposition of these oxides will occur during dehydration. Other Group VIII metals will not decompose, therefore remaining as oxides. Although the catalysts of the present invention can be employed in the hydrocracking reaction with the Group VIII component being in the form of the metal, the metal oxide, or other compounds thereof, e.g., the metal sulfides, the preferred form will vary with the particular Group VIII metal or metals present in the catalyst. Thus, in the case of catalysts containing at least one member of the platinum-palladium series, it is preferred that the hydrocracking reaction be conducted with these metals in the metallic state. Accordingly, those members of the platinum-palladium series that do not decompose the oxide during dehydration or thermactivation should preferably be reduced, and this can be done in several ways. For example, the xerogel can be contacted with flowing hydrogen at temperatures from about 400 to 900° F., preferably at elevated pressures (e.g., 1200 p.s.i.g.). Reduction will also take place in situ, i.e., in the reaction zone, when the dehydrated xerogel is placed therein and heated to the desired hydrocracking reaction temperature. In order to lessen the chances of temperature runaways within the reaction zone, the xerogel can be contacted with a mixture of hydrogen and sulfur-containing fluid so as to convert the palladium and/or platinum series metal to the corresponding sulfide. After the catalyst has been on-stream for a short period, and in the absence of large amounts of sulfur in the hydrocarbon feed (above about 0.5%), the sulfur will be stripped from the catalyst, leaving the metal as the hydrogenating-dehydrogenating compound. However, the sulfides of the palladium and/or platinum series metals are also suitable hydrogenating-dehydrogenating components. Therefore, if desired, sulfur-containing feed stocks can be easily employed in the hydrocracking process.

In the case of catalysts containing nickel and/or cobalt, it is preferred that these components be at least partially in the sulfided form. This can be accomplished by contacting the xerogel with a sulfur-containing fluid, such as hydrogen sulfide or hydrogen and a low molecular weight mercaptan or organic sulfide, at temperatures preferably below about 750° F.

Several catalysts are particularly preferred. One group of these preferred catalysts is where the hydrogenating-dehydrogenating component is palladium or platinum and the other metal oxide within the xerogel is alumina. The initial mixture preferably comprises a silica sol, aluminum chloride and palladium and/or platinum chloride and/or chloroplatinic acid and, following dehydration, the xerogel being thermactivated. Another particularly preferred catalyst is one wherein the hydrogenating-dehydrogenating component is nickel sulfide. The initial mixture preferably comprises a silica sol, aluminum chloride and nickel chloride, the concentrations of which are such that the resulting silica-alumina-nickel oxide xerogel has a composition falling within the total area enclosed by solid line 10 of accompanying FIGURE 1. Even more preferably, the xerogel composition will fall within the total area enclosed by dotted line 11 of FIGURE 1. These preferred catalysts are sulfided (in the manner described above) to convert at least a portion of the nickel oxide to nickel sulfide either before use or by contacting the catalyst in the hydrocracking zone with a sulfur-containing hydrocarbon feed.

It has been found that the hydrocracking catalysts produced in the above manner generally have extremely low fouling rates and universally have hydrocracking activities far superior to any known impregnated Group VIII metal-containing hydrocracking catalysts. The reason for this surprising result is not understood. Several possible explanations can be hypothesized, with one, all or none of the explanations correct. Perhaps the procedure leads to a more uniform distribution of the Group VIII metal particles within the siliceous composite; perhaps these particles are smaller in size; or perhaps the Group VIII metals react in some manner with the silica and/or other metal (e.g., aluminum) present. In any case, the superiority of such catalysts over those wherein the hydrogenating-dehydrogenating components are impregnated upon supports is quite marked. For example, in the case of platinum-palladium-containing catalysts prepared in accordance with the present method, it has been found that they will considerably improve the hydrocracking processes of the type exemplified in U.S. Patent 2,945,806 (Ciapetta) previously referred to in that it will allow the process to be conducted at lower operating temperatures at the same conversion level, will also reduce the production of undesirable light gaseous products and coke, and, in addition, will reduce the amount of aromatic hydrogenation. This decrease in aromatic saturation, evidenced by the lower aniline point of the reaction products even at the higher conversion levels attainable with the subject catalysts, is advantageous in several respects. Thus, hydrogen consumption is reduced, fewer desirable aromatics are destroyed, and temperature variations in the system are minimized. Also for example, it has been found that nickel and/or cobalt sulfide-containing catalysts prepared according to the present method will allow the hydrocracking process of the type disclosed in U.S. Patent No. 2,944,066 (Scott), likewise referred to above, to be operated at even lower temperatures and for longer on-stream periods because of the high activities of the catalysts and their extremely low fouling rates, i.e., resistance to catalyst deactivation by catalyst poisons.

Reference has been made, and will be made in even more detail, to catalyst activity, which refers to the ability of a catalyst to promote the hydrocracking reaction of the present invention. The hydrocracking activity of any particular catalyst can be best shown by a standard test from which the "activity index" of the catalyst can be determined and which can be used to effectively compare various catalysts. However, it must be emphasized that the differences in activity index levels between catalysts are highly significant and are not linear in function. For example, a catalyst having an activity index of 14 has been found to hydrocrack a particular cracked cycle oil feed under specific conditions of temperature (570° F.), pressure and feed space rate to products boiling below the initial boiling point of the feed at per-pass conversion of 20 volume percent. Under identical conditions and with the same feed, catalysts with activity indices of 21 and 28 gave per-pass conversion of 49 and 56 volume percent, respectively. The nonlinearity is shown by the fact that doubling the activity index (from 14 to 28) actually almost tripled the per-pass conversion (20 to 56 volume percent). Thus, it can be seen that what may appear to be a nominal increase in the activity index is, in fact, one of considerable importance, the difference being not merely one of the degree but of kind.

The test to determine the activity index of the catalyst broadly involves a determination of the conversion of a standard and readily obtainable hydrocarbon feed stock of defined physical and chemical characteristics to products falling below the initial boiling point of said stock under defined operating conditions. The feed stock employed is a catalytic cycle oil recovered as a distillate fraction from the effluent of a fluid-type of catalysts cracking unit, the recovered fraction being one containing about equal proportions of aromatics and of paraffins plus naphthenes, and boiling over a range of from approximately 440° to 660° F. (as determined by ASTM D-158) prior to any hydrofining treatment given the feed to reduce its basic nitrogen content to a level below 5 p.p.m., this being the maximum amount permitted in the test feed. The specific test feed employed in obtaining the activity index values of all catalysts given herein was obtained from a fluid catalytic cracking unit being charged with a mixture of light and heavy gas oils cut from a predominantly California Valley crude. The feed was hydrofined to produce the actual test stock which had the following inspections:

TABLE I

INSPECTIONS OF HYDROFINED CYCLE OIL TEST SAMPLE

| | |
|---|---|
| Gravity, ° API | 29.2 |
| Aniline point, ° F. | 100.2 |
| Nitrogen (basic), p.p.m. | 0.3 |
| Aromatics, vol. percent | 47 |
| Naphthenes, vol. percent | 37 |
| Paraffins, vol. percent | 19 |
| ASTM distillation (D-158), ° F.: | |
| Start | 362 |
| 5% | 441 |
| 10% | 453 |
| 30% | 481 |
| 50% | 500 |
| 70% | 523 |
| 90% | 560 |
| 95% | 577 |
| End of point | 624 |

The equipment employed in determining the activity index of the catalyst was a conventional continuous feed pilot unit, operated once-through with hydrocarbon feed and hydrogen gas. It consisted of a cylindrical reaction chamber operated downflow with a preheating section, followed by a section containing the catalyst under test, and enclosed in a temperature-controlled metal block to permit controlled temperature operation, together with the necessary appurtenances, such as feed burettes, feed pump, hydrogen supply, condenser, high pressure separator, provided with means for sampling the gas and liquid phases, back-pressure regulators and thermocouples. For accuracy in hydrogen feed, hydrogen was compressed into a hydrogen accumulator or burette whence it was fed to the reactor by displacement with oil fed at a constant rate from a reservoir by means of a pump.

In testing a catalyst to determine its activity index, the foregoing hydrofined cycle oil test stock, along with 12,000 s.c.f. of hydrogen per barrel of feed, is first passed for 14 hours through a mass of catalyst at a liquid hourly space velocity of 2 and at a catalyst temperature of 570° F. The catalyst temperature is then reduced to 540° F., and the feed passed through for another 14 hours at the same rate. Samples of the products are collected at about 2-hour intervals during the entire 28 hour run. These samples are allowed to flash off light hydrocarbons at ambient temperature and pressure, following which a determination is made of the API gravity of each sample. The aniline point of the samples may also be determined when it is desired to obtain an indication of the relative tendency of the particular catalyst to hydrogenate aromatics present in the feed. The individual API gravity values are then plotted and a smooth curve is drawn from which an average value may be obtained. Samples collected at the end of the eighth hour of operation at the 540° F. temperatures are usually regarded as representative of steady-state operating conditions and may be distilled to determine conversion to product boiling below the initial boiling point of the feed. This conversion under steady test conditions is a true measure of the activity of the catalyst. However, the API gravity of the product samples or samples minus the API gravity of the feed, is a rapid and convenient method of characterizing the catalyst which correlates smoothly with conversion. For convenience, the foregoing API gravity rise is referred to as the activity index of the catalyst.

While reference has been made above to the use of a particular catalytic cycle stock in connection with determining the activity index of the catalyst, it has been found that similar activity index values can be obtained with catalytic cycle stocks obtained from other than California crudes, provided the sample employed as feed has substantially the same characteristics as that of the feed described above. While the use of such other test feeds may give slightly different absolute values than those described herein, such differences are without influence on conclusions reached relating to catalyst activity inasmuch as the test stock is serving primarily as a relative standard by which to judge the conversion activity of the catalyst.

It will be noted that the activity index determination described above is conducted at a catalyst temperature of 540° F., although a somewhat higher temperature is employed prior to the actual test. However, this temperature can be altered to best show the activity of various catalysts. This alteration is not done during the actual determination but is kept constant while sampling. Since the activity index is based upon feed conversion, it can be seen that too high a reaction temperature could result in 100% conversions and too low a temperature result in conversions so low that comparison would be difficult. With the catalysts herein described, reaction temperatures during the actual test determination are maintained either at 540° or 570° F. However, it must be understood that the same catalyst would have a different activity index at these two catalyst temperatures.

*Example 1*

A catalyst suitable for use in the process of the present invention was produced as follows.

2082.2 grams of $AlCl_3 \cdot 6H_2O$ and 575.5 grams of $NiCl_2 \cdot 6H_2O$ were dissolved in a solution of methyl alcohol (40,000 ml.) and water (4,000 ml.) and thoroughly stirred. To the resulting mixture was added 2240 ml. of $SiO_4(C_2H_5)_4$, thereby producing a silica sol containing both nickel and aluminum ions. This mixture was stirred and allowed to stand for two hours. Propylene oxide, in the amount of 7500 ml., was then added, and the resulting mixture poured into dishes. After a 10 minute gelation time, a hydrocogel was formed. The latter was allowed to stand for 24 hours at ambient temperature and then was dried in an oven at 250° F. for 24 hours. It was then dehydrated at 1000° F. for 2 hours. The dehydrated xerogel had a surface area of 399 m.$^2$/g. The xerogel was then thermactivated by heating with hot, dry air to a temperature of 1400° F. for two hours. The thermactivated xerogel had a composition (in weight percent) of 42% alumina, 11.7% nickel oxide (9.2% nickel) and 46.3% silica. The xerogel was then inserted in a reaction zone and the nickel oxide reduced by contact with flowing hydrogen at a temperature of 520° F. and a total pressure of 1200 p.s.i.g. A mixture containing 10 volume percent ethyl mercaptan in mixed hexanes was then passed into the reaction zone along with the hydrogen for a period of 4 hours. This step successfully sulfided the nickel component of the xerogel, thereby producing the final catalyst, herein called Catalyst A.

The activity index of this catalyst was then determined in the manner previously described, the catalyst temperature during the sampling being 540° F. The activity index of the catalyst was found to be 21.1.

*Example 2*

This example is inserted for comparative purposes only, to show that a catalyst prepared in a manner different than that of the present invention is considerably inferior with respect to catalyst hydrocracking activity.

A commercial silica- alumina cracking catalyst (8–14 mesh) containing about 12 weight percent alumina and about 88 weight percent silica, prepared by adding an aqueous acidic solution containing an aluminum salt to an aqueous solution of sodium silicate, thereby coprecipitating the silica and alumina simultaneously, was impregnated with a solution of nickel nitrate. The nickel (as the metal) amounted to about 7 weight percent of the total weight of the catalyst. The catalyst was dried in a kiln to 600° F. and then therm-activated by contact for 2.2 hours with hot, dried air at an average temperature of 1427° F. The nickel oxide was then reduced by contacting the catalyst with hydrogen (1.6 s.f.c. per hour) at atmospheric pressure while heating from 60° to 570° F. for one hour. The nickel was then sulfided by contacting the catalyst with a 10 volume percent ethyl mercaptan in mixed hexanes for four hours at 600° F.

This catalyst, herein referred to as Catalyst B, was then subjected to the same described test to determine its activity index at 540° F. The testing was done in the same manner as the catalyst of Example 1. The activity index was 16, well below that of the catalyst described in Example 1.

A portion of the catalyst, prepared according to the manner described above in this example, was not therm-activated. Instead, following kiln drying at 600° F., it was calcined for two hours for 1000° F. and then sulfided by contact with the ethyl mercaptan in mixed hexanes for four hours at 600° F. The activity index of this unthermactivated catalyst (Catalyst B$^1$), tested at 570° F., was found to be 10.

*Example 3*

A catalyst was prepared in the same manner as Catalyst

A of Example 1 except that amounts of materials employed were different. These amounts are as follows:

| | | |
|---|---|---|
| $AlCl_3 \cdot 6H_2O$ | g | 56.75 |
| $NiCl_2 \cdot 6H_2O$ | g | 29.10 |
| $CH_3OH$ | ml | 100 |
| $H_2O$ | ml | 100 |
| $SiO_4(C_2H_5)_4$ | ml | 307 |
| Propylene oxide | ml | 101 |

Prior to thermactivation, the xerogel had a surface area of 466 m.$^2$/g. After thermactivation, the xerogel had a composition (in weight percent) of 10.6% alumina, about 8.4% nickel oxide (about 7% nickel) and the remainder (about 81%) silica. After sulfiding in the manner of Example 1, the catalyst was therefore of a composition almost identical with the comparative Catalyst B described in Example 2.

This catalyst (Catalyst C) was subjected to the identical activity index determination of the Catalysts A and B. Its activity index was 25.1, considerably above comparative Catalyst B.

A proportion of this xerogel was not thermactivated prior to sulfiding. Instead, after drying and dehydrating at 1000° F. for two hours, the nickel was sulfided in the manner described in Example 1. The activity index of this unthermactivated catalyst (Catalyst C$^1$), tested at 570° F., was found to be 16.2. It should be noted that unthermactivated Catalyst C$^1$, prepared according to the present invention, had a much higher activity index (16.2) than the unthermactivated comparative Catalyst B$^1$ (10) described in Example 2, and that they had almost identical compositions.

Example 4

In this example, the superior fouling rate of Catalyst A over that of comparative Catalyst B is graphically shown. Both catalysts were separately contacted with an identical feed stock and hydrogen in a hydrocracking reactor. The feed was a hydrofined light catalytic cracking unit cycle oil of 30.4° API gravity, having an end point of about 550° F., and a total nitrogen content of 0.5 p.p.m. Contact was made at a liquid hourly space velocity (LHSV) of 1.5 at 1200 p.s.i.g. and a hydrogen gas rate of from 5600 to 6500 standard cubic feet (s.c.f.) per barrel. The reaction temperatures were adjusted to that a per-pass conversion of 60% below a 400° F. cut point was maintained. The adjustments necessary to be made upon the reaction temperatures gives rise to the fouling rate determinations. Thus, as the catalyst becomes deactivated, higher reaction temperatures are necessary in order to maintain the required 60% conversion of the feed. The more rapid the rate of reaction temperature increase, the more rapid the rate of undesirable catalyst fouling. It is desired to hydrocrack at the lowest possible temperature, since the advantages to on-stream catalyst lift, before regeneration or replacement of the catalyst is necessary, are apparent and of decided benefit. In short, the lower the fouling rate of a catalyst, the more desirable it is.

Figure 2:
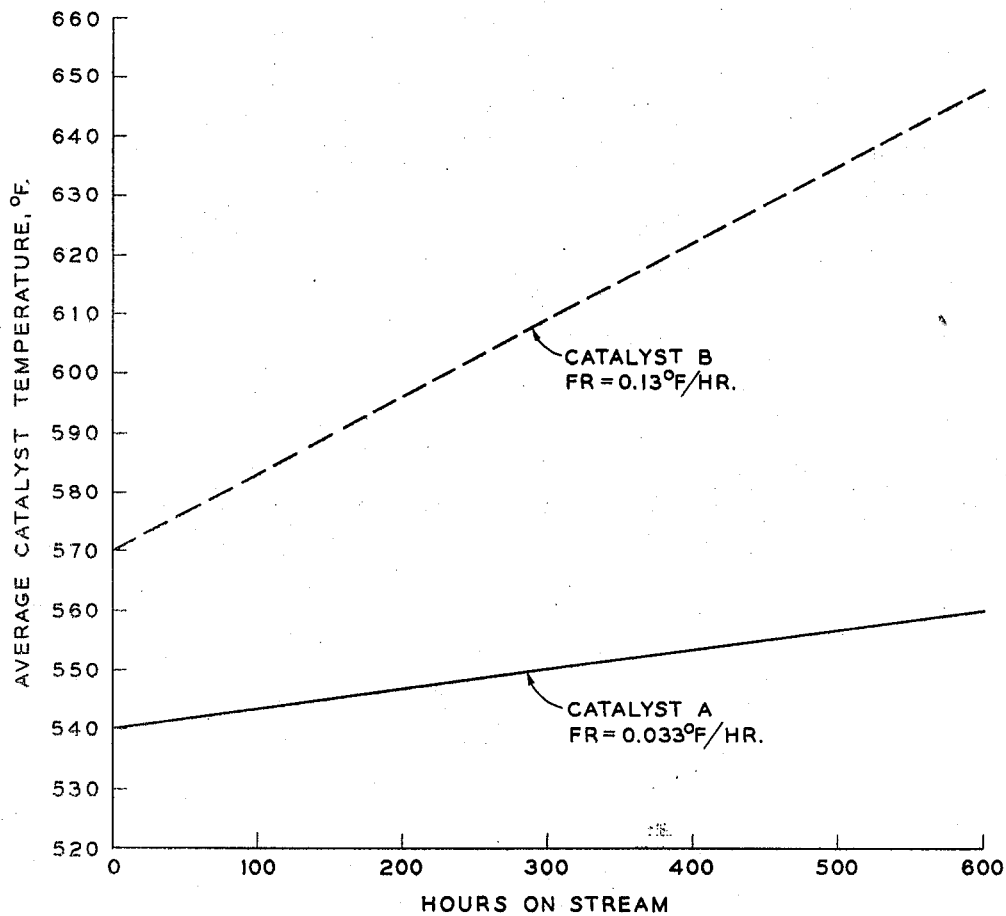

The accompanying FIGURE 2 shows a comparison of Catalysts A and B with respect to hours on stream versus the average catalyst temperatures within the hydrocracking reactor. The lines represent average temperature readings taken about once every eight hours during the 600 hour runs. These temperatures were adjusted every eight hours so as to maintain the desired 60% conversion. Very little divergence from this desired conversion value was encountered in either run. From the figure, it will be seen that Catalyst B had a considerably higher (about 30° F.) starting temperature, which shows it was much less active a catalyst, and further, the reaction temperature necessary to maintain the desired conversion rose quite rapidly in comparison with that necessary with Catalyst A, a catalyst prepared according to the present invention. Thus, after 600 hours, Catalyst B required a temperature of about 87° F. higher than that necessary for Catalyst A for the identical conversion. The advantages are apparent, particularly when the catalysts are to be employed in low temperature hydrocracking reactions where it is desired to keep reaction temperatures below 800° F., or, as is often the case, below about 700° F.

The fouling rate (FR) can be expressed in terms of temperature and time. Catalyst B had an FR of about 0.13° F. per hour, which means that the reaction (and catalyst) temperature had to be increased about 0.13° F. every hour in order to maintain the 60% conversion. Catalyst A had an FR of only about 0.033° F. per hour, or, only about 25% of Catalyst B.

From the above, it can be seen that the catalyst prepared according to the present invention had a hydrocracking activity considerably greater than the conventional catalyst described in Example 2. Furthermore, the conventional catalyst had about 4 times the fouling rate as the catalyst prepared according to the invention (Example 1). The reasons for this proven superiority are not known definitely but this superiority is clearly present.

Example 5

The example is also inserted for comparative purposes. Three catalysts (Catalysts D, E and F) were made in a manner similar to the method of Catalyst A of Example 1, except that the nickel component was not included in producing the hydrocogel but was later impregnated upon the silica-alumina xerogel. Thus, the method involved mixing the $AlCl_3 \cdot 6H_2O$ and $SiO_4(C_2H_5)_4$ and thereafter adding the propylene oxide. In all cases, a hydrocogel formed, was allowed to stand for 24 hours, dried in an oven at 250° F. for 24 hours, and then dehydrated for 2 hours at 1000° F. The resulting xerogels were then impregnated with a solution of nickel nitrate, dried in a kiln and calcined at about 1000° F., and thermactivated with hot, dry air for 2 hours at about 1400° F. The nickel was reduced and sulfided as described in Example 2. These three catalysts had the following compositions (in weight percent) prior to reduction and sulfiding:

| | Catalyst D | Catalyst E | Catalyst F |
|---|---|---|---|
| | Percent | Percent | Percent |
| Silica | 83.6 | 72 | 43.9 |
| Alumina | 11.4 | 24 | 43.9 |
| Nickel Oxide | 5.0 | 4 | 12.2 |

The three catalysts were then subjected to the 540° F. activity index test. Catalyst D had an activity index of only 9.2, Catalyst E had 7.3, and Catalyst F an index of 14.7, even below that of comparative Catalyst B of Example 2.

From these data it can be seen that, in order to attain superior catalyst activities, the nickel component of the catalyst must be incorporated in the original hydrocogel and cannot be later disposed on the silica-alumina by impregnation or the like. Furthermore, it has been found that if the Group VIII metal component is incorporated in the silica-alumina composite when the latter is made by conventional coprecipitation techniques (as described briefly in Example 2), the advantages of the method of the present invention will not be realized.

Example 6

A series of catalysts of varying composition were made in accordance with the method described in Example 1, the difference being those of concentrations of the components in the mixtures. The compositions of the thermactivated xerogels, containing nickel oxide, silica and alumina, are plotted in FIGURE 1. The xerogels were then reduced and sulfided in the manner of Example 1 to convert substantial portions of the nickel oxides to the corresponding sulfides. The catalysts were then subjected to the 540° F. activity index test. The activity indexes of these sulfided catalysts are noted in FIGURE 1 along side the points corresponding to the compositions of the catalysts prior to the conversion of the nickel oxides to the sulfides.

The plots of these catalysts in FIGURE 1 show that all the catalysts within the total area enclosed by solid line 10 are operable and capable of hydrocracking. However, FIGURE 1 also shows the superior activities of catalysts having compositions (prior to sulfiding the nickel component) falling within the total area enclosed by dotted line 11. Thus, these catalysts are highly preferred.

*Example 7*

A cobalt sulfide-silica-alumina catalyst (Catalyst G) was prepared in a similar manner as Catalyst A of Example 1 with noted exceptions. The amounts of materials are as follows:

| | |
|---|---|
| $AlCl_3 \cdot 6H_2O$ _____ g__ | 55.55 |
| $CoCl_3 \cdot 6H_2O$ _____ g__ | 241.43 |
| $CH_3OH$ _____ ml__ | 4000.00 |
| $H_2O$ _____ ml__ | 400.00 |
| $SiO_4(C_2H_5)_4$ _____ ml__ | 224.00 |
| Propylene oxide _____ ml__ | 705.00 |

Gel time for the hydrocogel was 15 minutes. The xerogel (about 14% cobalt oxide, 39% alumina and about 47% silica) was not thermactivated but was calcined for 2 hours at 1000° F. Its surface area, following calcining, was about 448 m.$^2$/g. The catalyst, after reducing and sulfiding the cobalt, was tested for a 570° F. activity index, which resulted in an index of 10.2. A cobalt sulfide catalyst, wherein the cobalt is impregnated upon a silica-alumina coprecipitated support, has an unthermactivated 570° F. activity index well below 5.

*Example 8*

Another catalyst (Catalyst H) suitable for use in the process of the present invention was made as follows:

115 ml. of $SiCl_4$ was added under the surface of 2000 ml. of absolute ethyl alcohol, the temperature being kept below 50° C. To this mixture was added 1500 ml. of methyl alcohol. 400 ml. of water was then slowly added, again keeping the temperature below 50° C. To the resulting silica sol was added 57.56 g. of $NiCl_2 \cdot 6H_2O$ and 241.4 g. of $AlCl_3 \cdot 6H_2O$ which was dissolved in the sol. The mixture was stirred for 25 minutes at room temperature. Then 1055 ml. of propylene oxide was added and, after a gel time of 10 minutes, a hydrocogel was formed. This hydrocogel was allowed to stand at room temperature for 2 days. It was then dried at 260° F. for about 12 hours and then dehydrated for 2 hours at 1000° F. The resulting xerogel had a surface area of 447 m.$^2$/g. and a composition of 41.1 weight percent alumina, 14.4 weight percent nickel oxide and 44.5 weight percent silica. The xerogel was then thermactivated in the manner shown in Example 1. The nickel component of the xerogel was then reduced and sulfided as described in Example 1. The catalyst was activity tested at 570° F. and had an activity index of 33.7.

*Example 9*

This example shows another method of manufacturing a catalyst (Catalyst I) suitable for use in the hydrocracking process of the invention.

60 ml. of 0.5 N HCl was added to 25.15 ml. of ethyl alcohol. To this mixture, 251 ml. of $SiO_4(C_2H_5)_4$ was slowly added, thereby hydrolyzing the silicate. Water (100 ml.) was then added to produce the final silica sol. In a separate container, 97.5 g. of $NiCl_2 \cdot 6H_2O$ and 474 g. of $AlCl_3 \cdot 6H_2O$ were dissolved in 630 ml. of water. The silica sol was added to the latter solution and the entire mixture chilled to below 10° C. in an ice bath. To this mixture was added 335 ml. of ethylene oxide (previously chilled in Dry Ice to permit its use as a liquid) and the resulting mixture stirred. The mixture set to a hydrocogel in 15 minutes. It was allowed to stand for several hours, was then dried in air at 250° F. and then dehydrated at 1000° F. for 2 hours. After dehydration, the xerogel had a composition (in weight percent) of 15.1% nickel oxide, 48.7% alumina and 36.2% silica. A portion of this xerogel was thermactivated in dry air at 1400° F. and the nickel component sulfided in the manner in Example 1.

*Example 10*

This example describes the method of manufacturing a suitable hydrocracking catalyst (Catalyst J) containing silica, zirconia and nickel sulfide.

27 ml. of 0.5 N HCl was added to 1100 ml. of methyl alcohol. To this mixture, 1032 ml. of $SiO_4(C_2H_5)_4$ was slowly added to hydrolyze the silicate. In a separate container, 194.3 g. of $NiCl_2 \cdot 6H_2O$ and 156.2 g. $ZrOCl_2 \cdot 8H_2O$ were dissolved in 1400 ml. of water and 1700 ml. of methyl alcohol. The two solutions were mixed and cooled to a temperature below 10° C. To the resulting mixture, 367 ml. of propylene oxide was added. A hydrocogel was formed in about 10 minutes. The hydrocogel was dried at 250° F. and dehydrated at 1000° F. for 2 hours. After dehydration, the xerogel had a composition (in weight percent) of 15.9% nickel oxide, 13.5% zirconia and 70.6% silica. The xerogel was then thermactivated and the nickel sulfided in the manner described in Example 1.

*Example 11*

This example shows that, in addition to Group VII metal-containing hydrogenating-dehydrogenating components, the hydrocracking catalyst can include other hydrogenating-dehydrogenating compounds (tungsten sulfide in this example) such as Group VI metal components.

68 g. of tungsten chloride ($WCl_5$) were dissolved in 1000 ml. of methyl alcohol. In a separate container, 128 g. of $NiCl_2 \cdot 6H_2O$ and 236 g. of $AlCl_3 \cdot 6H_2O$ were dissolved in 1000 ml. of methyl alcohol. The two solutions were then slowly mixed. To the combined solutions, 76 ml. of $SiO_4(C_2H_5)_4$ was added, and following the silicate addition which formed a silica sol, 534 ml. of propylene oxide was quickly added which caused the formation of a hydrocogel. The latter was dried at 250° F. and dehydrated at 1000° F. for 2 hours. The dehydrated xerogel had a composition (in weight percent) of 27% nickel oxide, 26% tungsten oxide, 34% alumina and 13% silica. The catalyst was then thermactivated and tungsten and nickel components sulfided in the manner described in Example 1. The resulting catalyst is herein referred to as Catalyst K.

*Example 12*

A palladium catalyst suitable for use in the process of the present invention was produced as follows.

A silica sol was first produced by slowly adding 286.5 ml. of $SiO_4(C_2H_5)_4$ and about 78 ml. of water to a solution containing about 165 ml. of methyl alcohol, about 10 ml. of water and about 2 ml. of 0.5 N HCl. In a separate container of $AlCl_3 \cdot 6H_2O$, 3.99 grams of $$PdCl_2 \cdot 2H_2O$$

about 168 ml. of $CH_3OH$ and about 176 ml. of water. The two solutions were intimately admixed and chilled to about 10° C. Propylene oxide, in the amount of 127.3 ml., was then added and the mixture stirred. After about a one-minute gelation time, a hydrocogel was formed. The latter was allowed to stand for about 2 hours, was then oven-dried at 250° F. for about 12 hours, and then dehydrated at 1000° F. in a muffle furnace for 2 hours. This produced a xerogel having a composition (in weight percent) of 20% alumina, about 2.4% palladium oxide (about 2% palladium) and about 77.6% silica. The xerogel was then inserted in a reaction zone and contacted with flowing hydrogen at a temperature of 520° F. and a total pressure of 1200 p.s.i.g. A mixture containing 10 volume percent ethyl mercaptan in mixed hexanes was then passed into the reaction zone along with the hydrogen for a period of four hours. This step sulfided the palladium component of the xerogel. The sulfiding was done to prevent temperature runaways in the reactor upon first contact of the test feed with the catalyst. The sulfur on the catalyst is rapidly stripped therefrom under the reaction conditions employed, thereby providing a palladium metal catalyst during the effective on-stream period of the run.

The activity index of this catalyst (Catalyst L) was then determined in the manner described above, the catalyst temperature during the sampling being 540° F. The activity index of the catalyst was found to be 29.2. The aniline point of the product sample was 129.3° F.

Example 13

This example is inserted for comparative purposes only, to show that a palladium catalyst prepared in a manner different from that of the present invention is considerably inferior with respect to catalyst hydrocracking activity.

A commercial silic-alumina cracking catalyst (8–14 mesh) containing about 12 weight percent alumina and about 88 weight percent silica, prepared by adding an aqueous acidic solution containing an aluminum salt to an aqueous solution of sodium silicate, thereby coprecipitating the silica and alumina simultaneously, was impregnated with a solution of palladium chloride, hydrogen chloride and water. The palladium (as the metal) amounted to 2 weight percent of the total weight of the catalyst. The catalyst was dried in an oven at 250° F. and then calcined at 1000° F. for 2 hours. The palladium oxide was then reduced by contacting the catalyst with hydrogen (1.6 s.c.f. per hour) at atmospheric pressure while heating from 60° to 570° F. for one hour. The palladium was then sulfided by contacting the catalyst with a 10 volume percent ethyl mercaptan in mixed hexanes for four hours at 600° F.

This catalyst, herein referred to as Catalyst M, was then subjected to the same described test to determine its activity index at 540° F. The testing was done in the same manner as the catalyst in Example 1. The activity index was 15.7, well below that of Catalyst L described in Example 12. The aniline point of the product sample was 146.0° F., well above that of the product sample produced in Example 12. This clearly shows that much more undesirable hydrogenation occurred with comparative Catalyst M than with Catalyst L.

Example 14

A catalyst was prepared in the same manner as Catalyst L of Example 12 except that the amounts of materials employed were different. These amounts are as follows:

| | | |
|---|---|---|
| $AlCl_3 \cdot 6H_2O$ | g | 94.8 |
| $PdCl_2 \cdot 2H_2O$ | g | 1.0 |
| $CH_3OH$ (total) | ml | 333 |
| $H_2O$ (total) | ml | 264 |
| $SiO_4(C_2H_5)_4$ | ml | 286 |
| Propylene oxide | ml | 127.3 |

After dehydration, the xerogel had a composition (in weight percent) of 20% alumina, about 0.6% palladium oxide (about 0.5% palladium) and the remainder (about 79.4%) silica. After sulfiding in the manner of Example 12, this catalyst (Catalyst N) was subjected to the identical activity index determinator of the Catalysts L and M. Its 540° F. activity index was 33.8, considerably above comparative Catalyst M. The product sample had an aniline point of 134.6° F., again well below that of the sample produced by comparative Catalyst M.

Example 15

A catalyst was prepared in the same manner as Catalyst L of Example 12 except that the amounts of materials employed were different. These amounts are as follows:

| | | |
|---|---|---|
| $AlCl_3 \cdot 6H_2O$ | g | 189.5 |
| $PdCl_2 \cdot 2H_2O$ | g | 0.8 |
| $CH_3OH$ (total) | ml | 480 |
| $H_2O$ (total) | ml | 358 |
| $SiO_4(C_2H_5)_4$ | ml | 698 |
| Propylene oxide | ml | 248 |

After dehydration, the xerogel had a composition (in weight percent) of 17.6% alumina, about 0.19% palladium oxide (about 0.18% palladium) and the remainder (about 82.2%) silica. After sulfiding in the manner described in Example 12, this catalyst (Catalyst O) was subjected to the identical activity index determination of Catalysts L and M of Examples 12 and 13. Its 540° F. activity index was 30.6, also well above that of comparative Catalyst M. The product sample had an aniline point of 130.6° F., again below that of the sample produced by Catalyst M.

It should be observed that Catalysts N and O have considerably less palladium than impregnated Catalyst M, but still have such superior activity indices and lower aniline points.

Example 16

A platinum catalyst suitable for use in the present process was produced in the following manner.

A silica sol was produced by slowly adding 582 ml. of $SiO_4(C_2H_5)_4$ to a solution containing about 105 ml. of methyl alcohol, about 10 ml. of water and about 2 ml. of 0.5 N HCl. About 45 ml. of water was then added to the sol. In a separate container, another solution was formed containing 189.5 grams of $AlCl_3 \cdot 6H_2O$, 0.266 gram of $H_2PtCl_6 \cdot 10H_2O$, about 111 ml. of water and about 104 ml. of $CH_3OH$. The two solutions were admixed and chilled to about 10° C. Propylene oxide (213 ml.) was then added to the mixture. After stirring and about a one-minute gelation period, a hydrogel was formed. The hydrogel was allowed to stand for about 2 hours, then dried at 250° F. for about 12 hours, and then dehydrated at 1000° F. for 2 hours. This produced a xerogel having a composition (in weight percent) of 20% alumina, about 0.5% platinum oxide, and about 79.5% silica. A portion of this xerogel was then inserted in the reaction zone and sulfided in the manner of Example 12. Again, the sulfiding of the platinum was only temporary and was rapidly disulfided to the metal during the activity index testing done subsequently. This catalyst, Catalyst P, was tested in the manner described above and had a 540° F. activity index of 34.3. At 570° F. its activity index was 38.8. At the 540° F. test, the product sample had an aniline point of 135° F. and at 570° F., an aniline point of 131° F.

The remaining portion of the xerogel was then thermactivated by heating with hot, dry air to a temperature of 1380° F. and maintained at that temperature for two hours. This thermactivated xerogel was then sulfided as described in Example 12. This catalyst, Catalyst Q, was then activity tested at 540° F. and found to have an activity index of 41.5. At 570° F., its activity index was 43.8. The 540° F. product sample had an aniline point of 133.8° F. and, at 570° F., 131.8° F. The increased activity of Catalyst Q over that of Catalyst P, entirely due to the thermactivation step, clearly shows the preference for such a heat treatment.

Example 17

This example is presented for comparative purposes only, to show that a platinum catalyst prepared by impregnating a silica-alumina support is an inferior hydrocracking catalyst than one made in accordance with the method of the present invention.

A commercial silica-alumina cracking catalyst containing about 12 weight percent alumina and about 88 weight percent silica, prepared as described in Example 13, was impregnated with a solution of ammonium chloroplatinate. The platinum (as the metal) amounted to 0.2 weight percent of the total weight of the catalyst. The catalyst was dried and calcined at 1000° F. for 10 hours and then inserted in test reaction zone and contacted with hydrogen while heating from 60° to 570° F.

This catalyst, herein referred to as Catalyst R, was then subjected to the 570° F. activity test previously described. Catalyst R had an activity index of only 25.9. The product sample had an aniline point of 142.3° F., well above that produced by Catalyst P of Example 16.

*Example 18*

A catalyst was prepared in the same manner as Catalyst P of Example 16, except that the amounts of materials employed were as follows:

| | | |
|---|---|---|
| $AlCl_3 \cdot 6H_2O$ | g-- | 189.5 |
| $H_2PtCl_6 \cdot 10H_2O$ | g-- | 1.06 |
| $CH_3OH$ (total) | ml-- | 480 |
| $H_2O$ (total) | ml-- | 358 |
| $SiO_4(C_2H_5)_4$ | ml-- | 698 |
| Propylene oxide | ml-- | 248 |

After the 1000° F. dehydration step, the resulting xerogel had a composition (in weight percent) of 20% alumina, about 0.2% platinum (in the form of the oxide) and the remainder silica. After sulfiding in the manner of Example 12, this catalyst (Catalyst S) was subjected to both the 540° F. and the 570° F. activity tests. It had a 570° F. activity index of 35.5, well above that of comparative Catalyst R of Example 17, and a 540° F. activity index of 23.4. The product sample at the 570° F. test had an aniline point of 132.2° F. At the 540° F. test, the product aniline point was 135.9° F.

*Example 19*

This example shows that other compounds can be included in the preparation leading to xerogel catalyst containing other oxides.

This catalyst was prepared in the same manner as Catalyst P of Example 16, except (1), the amounts of materials used were different, and (2), $ZrOCl_2$ was dissolved along with the $AlCl_3 \cdot 6H_2O$ and $H_2PtCl_6 \cdot 10H_2O$ in the methanol-water solution. The amounts of materials employed were as follows:

| | | |
|---|---|---|
| $AlCl_3 \cdot 6H_2O$ | g-- | 189.5 |
| $H_2PtCl_6 \cdot 10H_2O$ | g-- | 2.66 |
| $ZrOCl_2$ | g-- | 10.45 |
| $CH_3OH$ (total) | ml-- | 209 |
| $H_2O$ (total) | ml-- | 166 |
| $SiO_4(C_2H_5)_4$ | ml-- | 592 |
| Propylene oxide | ml-- | 222 |

After the 1000° F. dehydration step, the resulting xerogel had a composition (in weight percent) of 20% alumina, 2.0% $ZrO_2$, about 0.5% platinum (in the form of the oxide) and the remainder silica. After sulfiding in the manner described in Example 12, this catalyst (Catalyst T) was subjected to both the 570° F. and the 540° F. activity tests. Catalyst T had a 570° F. activity index of 42.6 and a 540° F. activity index of 28.8. The product sample aniline point in the 540° F. test was 135.5° F.

*Example 20*

This catalyst (Catalyst U) was prepared in the same manner as Catalyst L of Example 12, except (1), the amounts of materials used were different, and (2), rhodium was substituted for palladium. The amounts of materials employed were as follows:

| | | |
|---|---|---|
| $AlCl_3 \cdot 6H_2O$ | g-- | 189.5 |
| $RhCl_3 \cdot 3H_2O$ | g-- | 2.55 |
| $CH_3OH$ (total) | ml-- | 217 |
| $H_2O$ (total) | ml-- | 217 |
| $SiO_4(C_2H_5)_4$ | ml-- | 592 |
| Propylene oxide | ml-- | 249 |

After the 1000° F. dehydration step, the resulting xerogel had a composition (in weight percent) of 17.7% alumina, about 0.5% rhodium oxide, and the remainder silica. After sulfiding, the catalyst was subjected to the 540° F. activity test. Its 540° F. activity index was 16.3 and the product aniline point at that temperature was only 113° F. This low aniline point, showing a relatively small degree of aromatics saturation, is especially surprising in view of the recognition in the art that rhodium is an extremely active hydrogenation catalyst.

*Example 21*

Catalyst V was prepared in the same manner as Catalyst L of Example 12, except that (1), the amounts of materials used were different, and (2), iridium was substituted for palladium. The amounts of materials used were as follows:

| | | |
|---|---|---|
| $AlCl_3 \cdot 6H_2O$ | g-- | 189.5 |
| $IrCl_3$ | g-- | 1.56 |
| $CH_3OH$ (total) | ml-- | 242 |
| $H_2O$ (total) | ml-- | 191 |
| $SiO_4(C_2H_5)_4$ | ml-- | 591 |
| Propylene oxide | ml-- | 248.5 |

After the 1000° F. dehydration step, the resulting xerogel had a composition (in weight percent) of 20% alumina, about 0.5% iridium and the remainder silica. After sulfiding, the catalyst was subjected to the 570° F. activity test. Its activity index at this test temperature was 13.4, and the product aniline point was only 110° F.

*Example 22*

Catalyst W was prepared in the same manner as Catalyst L of Example 12, except that (1), the amounts of materials used were different, and (2), osmium was substituted for palladium. The amounts of materials used were:

| | | |
|---|---|---|
| $AlCl_3 \cdot 6H_2O$ | g-- | 94.8 |
| $OsCl_3$ | g-- | 1.37 |
| $CH_3OH$ (total) | ml-- | 275 |
| $H_2O$ (total) | ml-- | 216 |
| $SiO_4(C_2H_5)_4$ | ml-- | 295 |
| Propylene oxide | ml-- | 247 |

After the 1000° F. dehydration step, the resulting xerogel had a composition (in weight percent) of 20% alumina, about 0.5% osmium and the remainder silica. The catalyst was activity tested at 570° F. and had an activity index of 11.5. The product aniline point was 106° F.

The above examples show a variety of catalysts suitable for use in the present hydrocracking process. Many of the examples show the preference for catalysts composed of Group VIII metals or compounds thereof incorporated within a silica-alumna xerogel. However, in addition to the silica, oxides other than alumina are also suitable as discussed and exemplified herein. Also, other metals or compounds thereof can be present in addition to the requisite three components described and claimed. Thus, the catalyst can also contain metals or compounds of such metals as tungsten, molybdenum, chromium, silver, and the like.

Any of the hydrocracking catalysts disclosed herein can be employed in any type of feed-catalyst contacting method suitable for hydrocracking. Thus, such methods as fixed-bed, moving-bed, slurry, or fluid catalyst systems can be employed by procedures well known in the art.

The catalysts of the present process are preferably employed in at least one fixed catalyst bed.

Although only specific modes of operating the hydrocracking process of the present invention, and only specific catalysts and methods of their manufacture have been described, numerous variations in the operation of the process and the catalysts could be made without departing from the spirit of the invention, and all such variations that fall within the scope of the appended claims are intended to be embraced thereby.

I claim:

1. An improved hydrocracking process comprising hydrocracking a hydrocarbon feed to products boiling below the initial boiling point of said feed by contacting said feed, in the presence of hydrogen and under hydrocracking conditions, with a catalyst comprising at least one Group VIII metal-containing hydrogenating-dehydrogenating component incorporated within an acidic solid xerogel comprising silica and at least one other metallic oxide selected from the group consisting of oxides of metals of Groups II, III and IV of the Periodic Table, said catalyst being prepared by adding at least one alkylene oxide, containing from 2 to 3 carbon atoms per molecule, to a mixture comprising a silica sol, at least one Group VIII metal halide and at least one other metal halide, the metal of said halide being the same metal as that present in said acidic solid xerogel, all of said halides being soluble in said silica sol, allowing said mixture to set into a hydrocogel, and dehydrating said hydrocogel to produce said catalyst.

2. The process of claim 1 wherein said metal halide, other than said Group VIII metal halide, is an aluminum halide.

3. The process of claim 1 wherein said hydrocracking conditions include reaction temperatures below about 850° F. and total pressures of at least 100 p.s.i.g.

4. The process of claim 3 wherein said hydrocarbon feed has a total nitrogen content of less than 10 p.p.m.

5. An improved hydrocracking process comprising hydrocracking a hydrocarbon feed to products boiling below the initial boiling point of said feed by contacting said feed, in the presence of hydrogen and under hydrocracking conditions, with a catalyst comprising at least one hydrogenating-dehydrogenating component selected from the group of metals having atomic numbers of 44 to 46, inclusive, and 76 to 78, inclusive, incorporated within an acidic solid xerogel comprising silica and at least one metallic oxide selected from the group consisting of oxides of metals of Groups II, III and IV of the Periodic Table, said catalyst being prepared by adding at least one alkylene oxide, containing from 2 to 3 carbon atoms per molecule, to a mixture comprising a silica sol, at least one halide selected from the group of halides of metals having atomic numbers of 44 to 46, inclusive, and 76 to 78, inclusive, and at least one other metal halide, the metal of said halide being the same metal as that present in said acidic solid xerogel, all of said halides being soluble in said silica sol, allowing said mixture to set into a hydrocogel, and dehydrating said hydrocogel to produce said catalyst.

6. The process of claim 5 wherein said hydrocracking conditions include reaction temperatures below about 850° F. and total pressures of at least 100 p.s.i.g.

7. The process of claim 6 wherein said hydrocarbon feed has a total nitrogen content of less than 10 p.p.m.

8. An improved hydrocracking process comprising hydrocracking a hydrocarbon feed to products boiling below the initial boiling point of said feed by contacting said feed, in the presence of hydrogen and under hydrocracking conditions, with a catalyst comprising a palladium hydrogenating-dehydrogenating component incorporated within a solid acidic xerogel comprising silica and alumina, said catalyst being prepared by adding at least one alkylene oxide, containing from 2 to 3 carbon atoms per molecule, to a mixture comprising a silica sol, at least one palladium halide and an aluminum halide, said halides being soluble in said silica sol, allowing said mixture to set into a hydrocogel, and dehydrating said hydrocogel to produce said catalyst.

9. The process of claim 8 wherein said aluminum halide is aluminum chloride.

10. The process of claim 8 wherein said hydrocracking conditions include reaction temperatures below about 850° F. and total pressures of at least 100 p.s.i.g.

11. The process of claim 10 wherein said hydrocarbon feed has a total nitrogen content of less than 10 p.p.m.

12. An improved hydrocracking process comprising hydrocracking a hydrocarbon feed to products boiling below the initial boiling point of said feed by contacting said feed, in the presence of hydrogen and under hydrocracking conditions, with a catalyst comprising a platinum hydrogenating-dehydrogenating component incorporated within a solid acidic xerogel comprising silica and alumina, said catalyst being prepared by adding at least one alkylene oxide, containing from 2 to 3 carbon atoms per molecule, to a mixture comprising a silica sol, at least one platinum halide and an aluminum halide, said halides being soluble in said silica sol, allowing said mixture to set into a hydrocogel, and dehydrating said hydrocogel to produce said catalyst.

13. The process of claim 12 wherein said aluminum halide is aluminum chloride.

14. The process of claim 12 wherein said hydrocracking conditions include reaction temperatures below about 850° F. and total pressures of at least 100 p.s.i.g.

15. The process of claim 14 wherein said hydrocarbon fed has a total nitrogen content of less than 10 p.p.m.

16. An improved hydrocracking process comprising hydrocracking a hydrocarbon feed to products boiling below the initial boiling point of said feed by contacting said feed, in the presence of hydrogen and under hydrocracking conditions, with a catalyst comprising a rhodium hydrogenating-dehydrogenating component incorporated within a solid acidic xerogel comprising silica and alumina, said catalyst being prepared by adding at least one alkylene oxide, containing from 2 to 3 carbon atoms per molecule, to a mixture comprising a silica sol, at least one rhodium halide and an aluminum halide, said halides being soluble in said silica sol, allowing said mixture to set into a hydrocogel, and dehydrating said hydrocogel to produce said catalyst.

17. The process of claim 16 wherein said aluminum halide is aluminum chloride.

18. The process of claim 16 wherein said hydrocracking conditions include reaction temperatures below about 850° F. and total pressures of at least 100 p.s.i.g.

19. The process of claim 18 wherein said hydrocarbon feed has a total nitrogen content of less than 10 p.p.m.

20. An improved hydrocracking process capable of operation for long on-stream periods without interruption which process comprises hydrocracking a hydrocarbon feed to products boiling below the initial boiling point of said feed by contacting said feed, in the presence of hydrogen and under hydrocracking conditions, with a catalyst comprising at least one hydrogenating-dehydrogenating component selected from the group consisting of nickel sulfide and cobalt sulfide incorporated within an acidic solid xerogel comprising silica and at least one metallic oxide selected from the group consisting of oxides of metals of Groups II, III and IV of the Periodic Table, said catalyst being prepared by adding at least one alkylene oxide, containing from 2 to 3 carbon atoms per molecule, to a mixture comprising a silica sol, at least one halide selected from the group consisting of nickel halide and cobalt halide, and at least one other metal halide wherein said metal is the same metal as that present in said acidic solid xerogel, said halides all being soluble in said silica sol, allowing said mixture to set into a hydrocogel, dehydrating said hydrocogel thereby substantially converting the components therein to their corresponding oxides, and contacting the resulting solid acidic xerogel with a sulfur-containing fluid to convert at least portions of the hydrogenating-dehydrogenating metal components to their corresponding sulfides.

21. The process of claim 20 wherein said hydrocracking conditions include reaction temperatures below about 850° F. and total pressures of at least 350 p.s.i.g.

22. The process of claim 19 wherein said hydrocarbon feed has a total nitrogen content of less than 10 p.p.m.

23. An improved hydrocracking process capable of operation for long on-stream periods without interruption which process comprises hydrocracking a hydrocarbon feed to products boiling below the initial boiling point of said feed by contacting said feed, in the presence of hydrogen and under hydrocracking conditions, with a catalyst comprising nickel sulfide incorporated within a solid acidic xerogel comprising silica and alumina, said catalyst being prepared by adding at least one alkylene oxide, containing from 2 to 3 carbon atoms per molecule, to a mixture comprising a silica sol, a nickel halide and an aluminum halide, said halides being soluble in said silica sol, the concentration of the components within said mixture being such that, upon setting into a hydrocogel and dehydrating, the composition of the resulting silica-alumina-nickel oxide xerogel will fall within the area enclosed by line 10 of FIGURE 1, allowing said mixture to set into a hydrocogel, dehydrating and hydrocogel thereby substantially converting the components therein to their corresponding oxides, and thereafter contacting the resulting oxide composition with a sulfur-containing fluid to convert at least a portion of the nickel component therein to the corresponding sulfide.

24. The process of claim 23 wherein said nickel halide is nickel chloride.

25. The process of claim 23 wherein said aluminum halide is aluminum chloride.

26. The process of claim 23 wherein the composition of the resulting silica-alumina-nickel oxide xerogel will fall within the area enclosed by line 11 of FIGURE 1.

27. The process of claim 23 wherein said hydrocracking conditions include reaction temperatures below about 850° F. and total pressures of at least 350 p.s.i.g.

28. The process of claim 27 wherein said hydrocarbon feed has a total nitrogen content of less than 10 p.p.m.

References Cited by the Examiner

UNITED STATES PATENTS

| | | | |
|---|---|---|---|
| 2,469,733 | 5/1949 | Kearby | 208—120 |
| 2,944,006 | 7/1960 | Scott | 208—109 |
| 2,945,806 | 7/1960 | Ciapetta | 208—110 |
| 2,964,462 | 12/1960 | Thomas et al. | 208—112 |
| 3,023,158 | 2/1962 | Watkins | 208—110 |
| 3,078,238 | 2/1963 | Beuther et al. | 208—109 |
| 3,119,763 | 1/1964 | Haas et al. | 208—110 |

DELBERT E. GANTZ, *Primary Examiner.*

A. RIMENS, *Assistant Examiner.*